United States Patent Office 3,188,362
Patented June 8, 1965

3,188,362
SEMI-RIGID EPOXY RESIN COMPOSITIONS
AND METHOD
John Delmonte, Glendale, Calif., assignor to Furane
Plastics, Inc., Los Angeles, Calif., a corporation of
California
No Drawing. Filed July 6, 1962, Ser. No. 208,115
20 Claims. (Cl. 260—835)

This invention relates to semi-rigid epoxy resin compositions which are useful in electric potting and encapsulation applications. The present invention includes new compositions and a method for preparing the same. This application is a continuation-in-part of my copending application Serial No. 703,516, filed December 18, 1957, now abandoned.

The epoxy resins, commercially available as uncured intermediate resins or partial polymers (polyethers of low molecular weight having terminal epoxy groups) under the trade names "Araldite," "Epon," etc., in the form of viscous liquids or low melting solid polymers commonly known as "lump" resins, are not thermosetting as such, but can be converted to the infusible state by crosslinking with the aid of hardeners or curing agents.

Conventional curing agents include the polyamines, such as diethylene triamine, triethylene tetramine, tetraethylene pentamine, certain polyamides (such as "Versamid" 115 and 125), trimethylene diamine, dimethyl and diethylaminopropylamine, mono and tridimethylamino methyl phenol, which will cure and react at room, or slightly elevated, temperatures (20–50° C.) to convert the epoxy partial polymers to an infusible, insoluble polymer with useful electrical, mechanical and chemical properties. High temperature curing amines useful in crosslinking the epoxies include: metaphenylene diamine; p,p' methylene dianiline, piperidine, diethanolamine, etc. The room temperature curing systems are distinguished by their short "pot life" and high reaction rates liberating high exothermic heat, a condition minimized in the use of high temperature curing agents.

The acid anhydrides such as the anhydrides of dibasic acids, e.g., succinic, maleic and phthalic acids are also used as curing agents. Phthalic acid derivatives which are substituted in the nucleus are used, including the hydrogenated phthalic acids and polymerized acid anhydrides, e.g., polyadipic and polysebacic acid anhydrides. The reaction mechanism with the epoxy resin produces a crosslinked polymer containing a lower concentration of hydroxy groups and having improved resistance to water, as compared with the amine-cured resins. Acid anhydrides produce highly crosslinked polymers of outstanding heat and water resistance. The products have improved electrical characteristics, but are disadvantageous in that they are harder than the amine-converted epoxy resins, and the anhydride curing agents require elevated temperatures for prolonged periods of time for good curing.

One of the principal objects of the present invention is to provide novel epoxy resin-anhydride compositions which produce products possessing the advantages of the conventional anhydride-cured resins, but which are not subject to the above and other disadvantages thereof.

Another object of the present invention is to provide novel epoxy resin-anhydride compositions capable of producing semi-rigid or flexible polymers.

Still another object of the present invention is to provide novel epoxy resin compositions having a long pot life, low fluidity and being capable of curing at moderately low temperatures to an infusible, insoluble semi-rigid or flexible structure of excellent chemical resistance and thermal stability and superior dielectric properties.

Other objects and advantages of this invention it is believed will be readily apparent from the following detailed description thereof.

Briefly, this invention comprehends within its scope the discovery that superior semi-rigid or flexible epoxy resin products are produced from novel epoxy resin compositions utilizing an acid anhydride or mixtures thereof as a curing agent and incorporating therein a polyol, preferably a high molecular weight diol or triol having a molecular weight in the range 200–5,000. The present invention includes the entirely unexpected and unpredictable discovery that by utilizing dodecenyl succinic anhydride and curing in the presence of a polyol or polyol mixtures, products of excellent flexibility characteristics are obtained. The molar ratio of anhydride to epoxy equivalents necessary to produce the optimum properties in the cured product must be greater than 1.0, although good results are obtained above about 0.8, whereas the conventional epoxy-anhydride compositions require an anhydride to epoxy equivalent mol ratio of substantially less than 1.0 for the production of a satisfactory product.

It has been further discovered that the curing rate of epoxy-anhydride-polyol compositions within the scope of this invention is effectively controlled by the inclusion therein of small amounts of the conventional epoxy curing agents, including tertiary amines such as triethanolamine, mono or tri-dimethyl amino phenol, amino glyoxalidines, piperidine, and secondary and primary amines, such as furfurylamine, monoethanolamine, diethylamino propylamine, etc., and polyamides. Such compounds, utilized as curing promoters in the compositions of the present invention, enhance the effectiveness of the anhydride curing agent, permitting a cure at temperatures lower than those possible with the anhydride or anhydride and polyol alone.

Another feature of the present invention resides in the discovery that better and more stabilized products are obtained by reacting the polyol and the epoxy together, and then adding the anhydride or the separate reaction mixture of the anhydride and the tertiary amine or other curing promoter to the polyol-epoxy reaction mixture.

The uncured epoxy partial polymers may be defined as a complex epoxide resin comprising a polyether derivative of a polyhydric organic compound, e.g., a polyhydric alcohol or phenol containing epoxy groups, and are disclosed in various places in the art. Among such references may be mentioned Castan Patent No. 2,324,483, Castan Patent No. 2,444,333, British Patents 518,057 and 579,698 and U.S. Patents 2,569,920 and 2,947,717. For the most part, these epoxy resins are based on the resinous product of reaction between an epihalogenohydrin, for instance epichlorohydrin or glycerol dichlorohydrin, and a phenol having at least two phenolic hydroxy groups, for example, 2,2'-bis-(para-hydroxyphenyl propane). U.S. Patents 2,494,295, 2,500,600 and 2,511,913 also describe examples of epoxy resins which may be employed in the practice of the present invention. An excellent description of these resins is found in the book entitled "Polymeric Processes," Chapter X, "Epoxy Resins," by Salvatore S. Stivola. By reference, all of the aforementioned patents and the publication are intended to be part of the present description of the epoxy resins used in the compositions of the present invention and for brevity, the epoxy resins will not be further described herein other than that they contain more than one ethylene oxide group, e.g., from 1 to 2 or more epoxide groups, per molecule, and may be prepared by effecting reaction between a polyhydric alcohol or phenols, for example hydroquinone, resorcinol, glycerine, and condensation products of phenols with ketones, for instance, 2,2'-bis-(para-hydroxyphenyl propane), commonly known as bisphenol A, with epichlorohydrin, and modifications with reactive diluents, such as allylglycidyl ether, phenyl glycidyl ether, butyl glycidyl ether, styrene oxide etc. For example, the reaction of epichlorohydrin with bisphenol A may be formulated as follows:

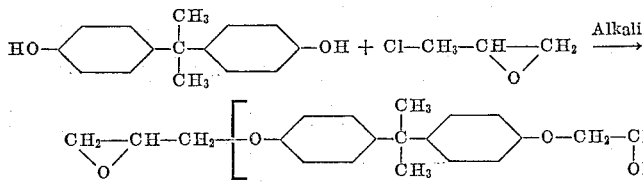
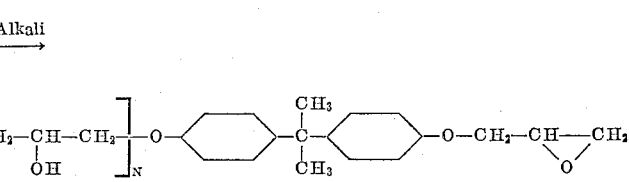

where N has an average value varying from around zero to about 7.

Preferred partial epoxy polymers include "Epon" 828, "Epon" 1001, "Epon" 1004, "Epon" 1007 (polymers of varying molecular weight, i.e., 390, 1000, 1850 and 3800 respectively, derived from bisphenol A and epichlorohydrin) and similar compounds such as "Araldite" 6010 and "Bakelite" ERL 2774. Other such polymers include combinations of liquid diglycidyl ethers of bisphenol-A (100 p.b.w.) plus liquid glycidyl ethers of trimer acid (0 to 150 p.b.w.), e.g., Shell Chemical Co. X 71.

Useful in the present invention are the liquid partial polymers of epoxy resins having a viscosity in the range of 6,000 to 40,000 centipoises at 23° C., with 160 to 600 grams per epoxy mol equivalent. Also useful to the practice of my invention are the higher molecular weight solid epoxies (melting points to 150° C.), which though yielding more viscous resins, form polymer structures with greater flexibility than possible with the low molecular weight derivatives. Where a low viscosity of the final curing mix is desired, the more fluid epoxy partial polymers are used. The viscosity may be lowered with the aid of reactive diluents well-known in the art, such as, for example, allyl glycidyl ether, phenyl glycidyl ethers, etc., and non-reactive diluents such as styrene or vinyl toluene, or chlorinated biphenyls. The polyol component itself serves as a reactive diluent to dissolve and/or reduce the viscosity of the higher molecular weight epoxy resins which are solids or too viscous for use as such. These solid or higher viscosity epoxies are in fact preferred for use in the composition of the present invention in that the higher proportion of hydroxyl groups favor the reaction with the polyols and the anhydrides.

The dodecenyl succinic anhydride is used alone or in admixture with a conventional anhydride curing agent. Because of their fluidity, mixtures of hexahydrophthalic anhydride and dodecenyl succinic anhydride in the proportion range of 1:1 to 5:1 are especially effective.

The rate of cure obtainable with the anhydride curing agents is greatly enhanced by the presence of a promoter comprising a conventional curing agent such as a tertiary, secondary or primary amine when limited in concentration to between about 0.5% and about 5% by weight of the anhydride. Most effective are compounds such as benzyldimethylamine, mono or tri-dimethyl amino methyl phenol, piperidine, piperazine, triethanolamine, monoethanolamine and the amino glyoxalidines. The ethanolamines are particularly effective because they, being also classified with the polyols, offer OH groups as well as their catalytic influences.

In preparing the compositions of the present invention it is usually most convenient to react the anhydride with the promoter and use the reaction product thereof with the epoxy-polyol combination. This is a desirable step not only because it simplifies the difficulties in the weighing and accurate proportioning of small amounts of the promoter, but because the products are found to have improved properties and are more stabilized.

Included in the polyols useful in the present invention are the hydroxyl terminated polyesters, hydroxyl terminated polyethers, polyethylene glycols, polypropylene glycols, triols such as ethylene oxide adducts of 1, 2, 3 hexanetriol, various ethanol amines, polyethers ("Pluranes"), derivatives of ethylene diamine in which active hydrogens have been replaced by groups containing hydroxyl radicals. Polyols of a wide range of molecular weight have been successfully employed, but preferably the polyols are liquid at room temperature and of a molecular weight at least equal to the average molecular weight of the epoxy resin. As little as 0.01 mol of polyol per mol of epoxy has an effect, but the amount of polyol should be maintained below about 0.5 mol per mol of epoxy to avoid the production of materials of poor thermal resistance and excessive softness.

The dodecenyl succinic anhydride permits the production of epoxy-resin products of greatly improved flexibility when used with polyols, as compared with other anhydride-polyol-epoxies. Also, because of the unique characteristic of dodecenyl succinic anhydride in the production of products of significantly lower distortion temperatures than other anhydride curing agents, it is possible to use less than conventional amounts of polyol in arriving at a product of a given flexibility, thus minimizing the deleterious effects upon tensile strength and elongation found with excessive amounts of polyols. While the chemical reactions brought about in the present invention are not entirely understood, and it is not certain whether the active hydrogen of the hydroxyl group or groups engages the oxirane ring of the epoxy resin or the anhydride group, or both, there is a distinct indication of a chemical bonding of the hydroxyl groups. That the polyol will react with the epoxy is clear; it has been observed that on long standing of mixtures of polyols and epoxies there is a measurable increase in the viscosity of such mixtures. However, because the polyols appear to have a slow reaction rate with the epoxy alone it is epecially effective to premix them with the epoxy to form one component for subsequent admixture with the anhydride or anhydride-promoter mixture.

The following specific examples are illustrative of the compositions and method of the present invention:

EXAMPLE 1

| | Part by weight |
|---|---|
| Epoxy ("Epon" 1001) | 100 |
| Polypropylene glycol (2025 mol wgt.) | 100 |
| Dodecenyl succinic anhydride | 100 |
| Tri-dimethyl amino methyl phenol | 1 |

The composition of Example 1 was prepared by dissolving the solid epoxy in the glycol, separately mixing the anhydride and the amine promoter and then combining the two mixtures. Specimens of this composition cured at 200° F. for 16 hours, followed by 250° F. for 2 hours had a Shore A hardness of about 80.

EXAMPLE 2

| | Part by weight |
|---|---|
| Epoxy ("Epon" 828) | 100 |
| Hydroxyl-terminated polyester (1000 mol wgt.) | 150 |
| Dodecenyl succinic anhydride | 50 |
| Hexahydrophthalic anhydride | 75 |
| Benzyldimethylamine | 8 |

The composition of Example 2, which illustrates the use of a mixture of anhydrides, was prepared in the same manner as the composition of Example 1, that is, by mixing the epoxy and polyol, and the anhydrides and promoter separately, then combining the two mixtures. The composition was cured in the same manner to produce a semi-rigid product.

The remarkable flexibilities achieved with the use of the dodecenyl succinic anhydride-epoxy-polyol compositions of the present invention, as compared with conventional anhydrides is clearly shown by the comparative data set forth in Table I below, wherein the Shore D hardnesses of several samples prepared with various compositions are set forth. The compositions and products were prepared as set forth in Example 1, with the changes noted in the table.

Table I

| Epoxy resin and anhydride constituents | Parts polyol added per hundred of resin plus anhydride | Shore D hardness at 75° F. (instantaneous/10 second) | | |
|---|---|---|---|---|
| | | Polypropylene glycol 2025 | Hydroxyl terminated polyester (Formrez 50) | Hydroxyl terminated polyether (Actol 31-56) |
| 1 mol epoxy resin* | 0 | 88/86 | 88/86 | 88/86 |
| 1 mol dodecenyl succinic anhydride (100/133 p.b.w.) | 25 | 70/55 | 78/68 | 64/50 |
| | 50 | 32/12 | 55/38 | 35/15 |
| 1 mol epoxy resin* | 0 | 90/87 | 90/87 | 90/87 |
| 1 mol succinic anhydride (100/50 p.b.w.) | 25 | 84/82 | 88/83 | 88/85 |
| | 50 | 70/53 | 70/46 | 68/50 |
| 1 mol epoxy resin* | 0 | 92/90 | 92/90 | 92/90 |
| 1 mol phthalic anhydride (100/75 p.b.w.) | 25 | 82/81 | 92/90 | 87/83 |
| | 50 | 58/50 | 80/74 | I |

*Epoxy resin used ("Araldite" 6010), a diglycidylether of bisphenol A, cure 12 hours at 300° F.
I—Incompatible.

As indicated above it has been found that the presence of the polyol constituent results in an increase in the anhydride-epoxy mol ratio and that for production of optimum properties in the cured product the mol ratio must be greater than 1.0. In fact, it has been found that for a given composition there is a critical point in the mol ratio range between 1.0 and about 1.5 at which the physical properties such as dissipation factor and hardness are at an optimum. Particularly important from the standpoint of good dielectric behavior is the dissipation factor, especially at low frequencies. This critical relationship is illustrated by the examples of Table II below wherein "A" represents "Epon" 828, "B" represents polypropylene glycol of 2000 molecular weight, and "C" represents dodecenyl succinic anhydride, each composition containing 1% by weight, based on the anhydride, of benzyl dimethylamine and being prepared and cured as indicated in Example 1:

Table II

| Example | Parts by weight | | | Molar ratio C to A | Dissipation factor (at 60 cycles) | Dielectric constant (at 60 cycles) |
|---|---|---|---|---|---|---|
| | A | B | C | | | |
| 3 | 100 | 100 | 100 | 0.75 | .023 | 4.7 |
| 4 | 100 | 100 | 133 | 1.00 | .018 | 4.1 |
| 5 | 100 | 100 | 166 | 1.25 | .017 | 3.9 |
| 6 | 100 | 100 | 199 | 1.50 | .020 | 4.0 |

It is apparent that for this type of composition the optimum concentration is that of Example 5, i.e., an anhydride to epoxy molar ratio of 1.25. The Shore D hardness of this example was about 55. It has been found as a result of further experiments that as the concentration of polyol is increased, the molar ratio of anhydride to epoxy must also be increased in order to obtain the optimum properties. Conversely, lower amounts of polyol will require less amounts of anhydride within the molar ratio range of above 1.0 and below about 1.5.

The compositions of the present invention are easily cured in the desired final form by heating for a length of time and at a temperature sufficient for a cure, and this of course contemplates low temperature-long time cures as well as relatively high temperature-short time cures.

Having fully described my invention, it is to be understood that I do not wish to be limited to the details set forth, but my invention is of the full scope of the appended claims.

I claim:

1. An epoxy resin composition comprising a glycidyl polyether of a polyhydric organic compound in which the polyhydric organic compound is selected from the group consisting of polyhydric alcohols and polyhydric phenols, from 0.01 to about 0.5 mol of a polyhydric alcohol per mol of said glycidyl polyether, and between 0.8 and about 1.5 mols of dodecenyl succinic anhydride per mol of said glycidyl polyether.

2. An epoxy resin composition comprising a glycidyl polyether of a polyhydric organic compound in which the polyhydric organic compound is selected from the group consisting of polyhydric alcohols and polyhydric phenols, from 0.01 to about 0.5 mol of a polyhydric alcohol per mol of said glycidyl polyether, between 0.8 and about 1.5 mols of dodecenyl succinic anhydride per mol of said glycidyl polyether, and an amine curing promoter.

3. An epoxy resin composition comprising a glycidyl polyether of a polyhydric organic compound in which the polyhydric organic compound is selected from the group consisting of polyhydric alcohols and polyhydric phenols, from 0.01 to about 0.5 mol of polypropylene glycol per mol of said glycidyl polyether, and between 1.0 and about 1.5 mols of dodecenyl succinic anhydride per mol of said glycidyl polyether.

4. An epoxy resin composition comprising a glycidyl polyether of a polyhydric organic compound in which the polyhydric organic compound is selected from the group consisting of polyhydric alcohols and polyhydric phenols, from 0.01 to about 0.5 mol of a polyhydric alcohol per mol of said glycidyl polyether, and between 1.0 and about 1.5 mols of a mixture of hexahydrophthalic anhydride and dodecenyl succinic anhydride in the proportion range of 1:1 to 5:1 parts by weight per mol of said glycidyl polyether.

5. An epoxy resin composition comprising a glycidyl polyether of a polyhydric organic compound in which the polyhydric organic compound is selected from the group consisting of polyhydric alcohols and polyhydric phenols, from 0.01 to about 0.5 mol of polypropylene glycol per mol of said glycidyl polyether, and between 1.0 and about 1.5 mols of a mixture of hexahydrophthalic anhydride and dodecenyl succinic anhydride in the proportion range of 1:1 to 5:1 parts by weight per mol of said glycidyl polyether.

6. An epoxy resin composition comprising the reaction product of 2,2'-bis-(para-hydroxyphenylpropane)

and epichlorohydrin, from 0.01 to about 0.5 mol of a polyhydric alcohol per mol of said reaction product, and between 1.0 and about 1.5 mols of dodecenyl succinic anhydride per mol of said reaction product.

7. An epoxy resin composition comprising the reaction product of 2,2'-bis-(para-hydroxyphenylpropane) and epichlorohydrin, from 0.01 to about 0.5 mol of polypropylene glycol per mol of said reaction product, and between 1.0 and about 1.5 mols of dodecenyl succinic anhydride per mol of said reaction product.

8. The process which comprises forming a mixture of the ingredients of claim 1, and heating said mixture for a time and at a temperature sufficient to effect curing thereof.

9. The process which comprises forming a first mixture comprising a glycidyl polyether of a polyhydric organic compound in which the polyhydric organic compound is selected from the group consisting of polyhydric alcohols and polyhydric phenols, and from 0.01 to about 0.5 mol of a polyhydric alcohol per mol of said glycidyl ether, forming a second mixture comprising dodecenyl succinic anhydride and an amine curing promoter, and mixing together said first and second mixtures in proportions to provide an anhydride to glycidyl polyether molar ratio of between 1.0 and about 1.5.

10. The process which comprises forming a first mixture comprising a glycidyl polyether of a polyhydric organic compound in which the polyhydric organic compound is selected from the group consisting of polyhydric alcohols and polyhydric phenols, and from 0.01 to about 0.5 mol of a polyhydric alcohol per mol of said glycidyl ether, forming a second mixture comprising dodecenyl succinic anhydride and an amine curing promoter, mixing together said first and second mixtures in proportions to provide an anhydride to glycidyl polyether molar ratio of between 1.0 and about 1.5 and heating the resulting mixture for a time and at a temperature sufficient to effect curing thereof.

11. The composition of claim 5 including a tertiary amine curing promoter.

12. The composition of claim 11 wherein said promoter comprises benzyldimethylamine.

13. The composition of claim 3 including a tertiary amine curing promoter.

14. The composition of claim 13 wherein said promoter comprises tri (dimethyl amino methyl) phenol.

15. The composition of claim 4 wherein said glycidyl polyether comprises about 100 parts by weight of a glycidyl polyether of a polyhydric phenol, wherein the polyhydric alcohol comprises about 150 parts by weight of an hydroxyl terminated polyester, wherein the hexahydrophthalic anhydride comprises about 75 parts by weight, wherein the dodecenyl succinic anhydride comprises about 50 parts by weight, and including between about 0.5% and about 5% by weight of a tertiary amine curing promoter, based upon the total weight of the two anhydrides.

16. The composition of claim 1, wherein the glycidyl polyether comprises a diglycidyl polyether of 2,2'-bis-(para-hydroxyphenyl propane).

17. A cross-linked, semi-rigid resinous reaction product resulting from the process of claim 8.

18. A cross-linked, semi-rigid resinous reaction product resulting from the process of claim 9.

19. The process of claim 9 wherein said selected compound is bisphenol A.

20. The process of claim 10 wherein said selected compound is bisphenol A.

References Cited by the Examiner

UNITED STATES PATENTS

| | | | |
|---|---|---|---|
| 2,324,483 | 7/43 | Castan | 260—47 |
| 2,731,444 | 1/56 | Greenlee | 260—47 |
| 2,830,031 | 4/58 | Fisch | 260—835 |
| 2,908,660 | 10/59 | Belanger | 260—32.8 |
| 2,947,717 | 8/60 | Belanger et al. | 260—835 |

FOREIGN PATENTS 629,111 9/49 Great Britain.

JOSEPH L. SCHOFER, *Primary Examiner.*
DONALD E. CZAJA, *Examiner.*